Patented Jan. 30, 1940

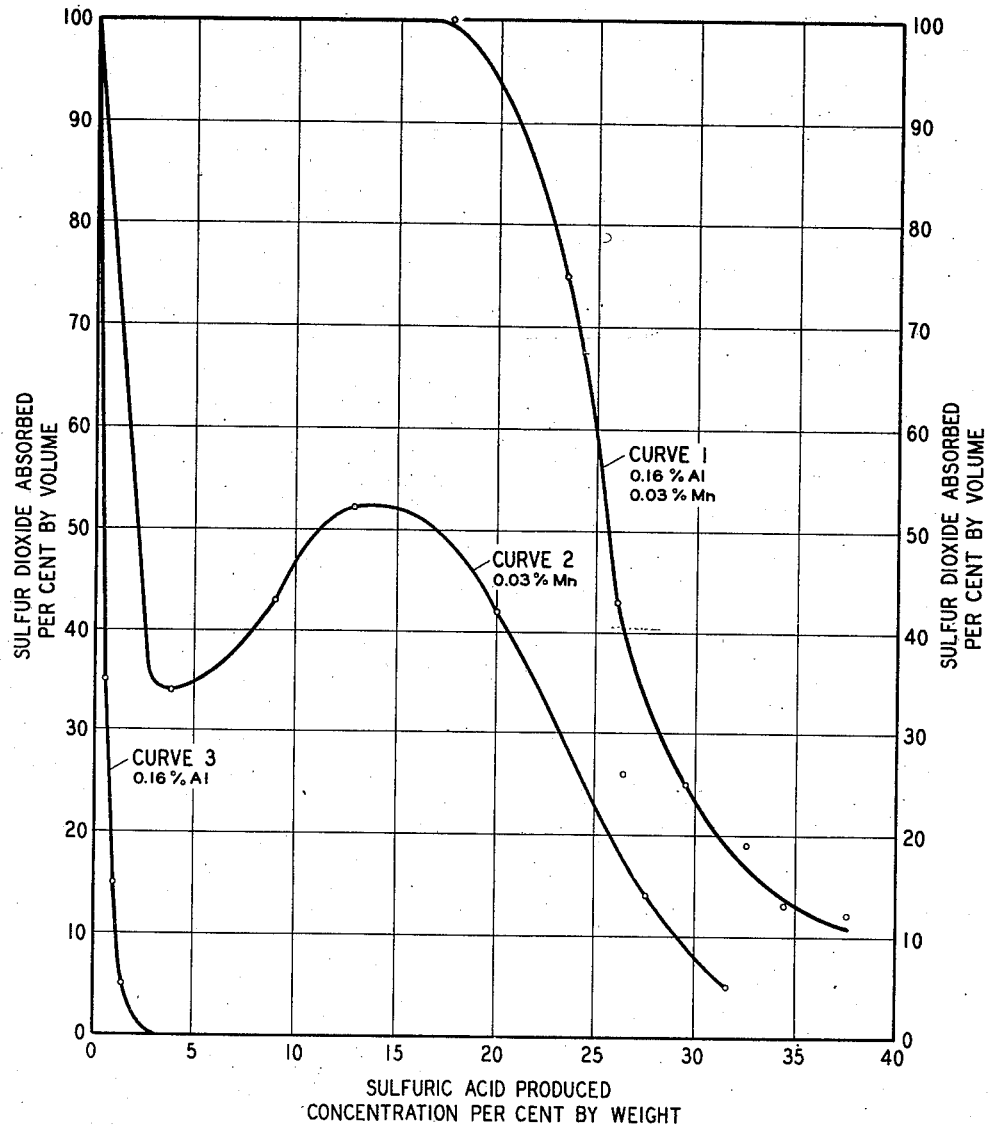

2,188,324

UNITED STATES PATENT OFFICE 2,188,324

MAKING SULPHURIC ACID

John H. Walthall, near Sheffield, Ala.

Application May 10, 1938, Serial No. 207,059

13 Claims. (Cl. 23—168)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of recovery of sulphur dioxide from a gaseous mixture containing the same, particularly by converting the sulphur dioxide into sulphuric acid.

One of the objects of this invention is to materially increase the rate of conversion of sulphur dioxide into sulphuric acid. Another object of this invention is to produce a high concentration of sulphuric acid in a short time. Still another object of this invention is to produce relatively high concentrations of sulphuric acid from gaseous mixtures containing relatively low concentrations of sulphur dioxide. A further object of this invention is to provide a process for the recovery of sulphur dioxide in the form of sulphuric acid from sulphates which may be decomposed by heating such as aluminum sulphate. A still further object of this invention includes the provision for a process of making an aqueous solution of sulphuric acid suitable for the production of aluminum sulphate from aluminum containing materials. Other objects of this invention include the provision of an improved liquid composition for absorbing sulphur dioxide and for converting the sulphur dioxide so absorbed into sulphuric acid.

It has long been known that the oxidation of sulphur dioxide in water is catalyzed by the presence of various metals. Manganese salts, such as the sulphate or nitrate, have been found to be excellent catalysts for this purpose. Ferrous sulphate and ferric sulphate have also been found to be catalysts but the rate of absorption of sulphur dioxide is much less than with a manganese salt. The effect of metallic salts added to absorbing solutions containing manganese has also been previously investigated. Copper and mercury have been reported as having an inhibiting effect while antimony, arsenic, chromium, cobalt, lead, magnesium, molybdenum, nickel, vanadium, and zinc have been reported as having no effect upon the absorption of sulphur dioxide in aqueous solutions containing manganese.

I have discovered that the presence of aluminum in an aqueous absorbing solution containing manganese results in a very substantial increase in the rate of absorption of sulphur dioxide from gaseous mixtures containing the same and also makes it possible to rapidly convert the sulphur dioxide so absorbed into sulphuric acid and to obtain aqueous solutions having substantial concentrations of sulphuric acid in relatively short periods of time.

In the accompanying drawing which forms a part of the specification, the per cent of the sulphur dioxide absorption as a function of the strength of the sulphuric acid produced is shown. Curve 1 shows this relationship for an aqueous absorption solution containing 0.03% by weight of manganese in the form of manganese sulphate and 0.16% by weight of aluminum in the form of aluminum sulphate. Curve 2 shows this same relationship for an aqueous solution containing 0.03% by weight of manganese in the form of manganese sulphate. Curve 3 also shows this same relationship for an aqueous absorbing solution containing 0.16% by weight of aluminum in the form of aluminum sulphate. The respective curves illustrate the values subsequently included in the first three examples for the operation of my invention and shown in Table 1, Table 2 and Table 3, respectively.

One example for the operation of my process is given for absorbing sulphur dioxide from a gaseous mixture containing 15 to 16% by volume of sulphur dioxide and 17 to 18% by volume of oxygen in an aqueous absorbing medium containing 0.03% by weight of manganese in the form of manganese sulphate, and 0.16% by weight of aluminum in the form of aluminum sulphate. The finely dispersed gaseous mixture was passed upward through 500 volumes of the absorbing medium at the rate of 675 to 700 volumes per minute based on the gaseous mixture or a rate of 100 to 110 volumes per minute based on its sulphur dioxide content (both volumes at STP). The concentration of the sulphuric acid produced in per cent by weight at the end of the total elapsed time and the sulphur dioxide absorbed in per cent by volume at the end of definite successive intervals of time between the last and preceding determinations are included in Table 1.

Table 1

| Time elapsed, minutes | Sulphuric acid, percent by weight | Sulphur dioxide absorbed, percent by volume |
|---|---|---|
| 0 | 0 | 100 |
| 200 | 17.6 | 100 |
| 300 | 23.3 | 75 |
| 400 | 26.0 | 43 |
| 600 | 29.5 | 25 |
| 850 | 32.5 | 19 |
| 1100 | 34.3 | 13 |
| 1418 | 37.5 | 12 |

During the entire time required for the production of aqueous solutions of sulphuric acid containing 37.5% sulphuric acid, 39% of the sulphur dioxide was absorbed.

The same procedure was followed using an aqueous absorption medium containing 0.03% by weight of manganese in the form of manganese sulphate. The concentration of the sulphuric acid produced in per cent by weight at the end of the total elapsed time and the sulphur dioxide absorbed in per cent by volume at the end of definite successive periods of time between the last and preceding determinations are included in Table 2.

*Table 2*

| Time elapsed, minutes | Sulphuric acid, percent by weight | Sulphur dioxide absorbed, percent by volume |
|---|---|---|
| 0 | 0 | 100 |
| 150 | 3.8 | 34 |
| 300 | 9.0 | 43 |
| 400 | 12.9 | 52 |
| 600 | 20.0 | 42 |
| 800 | 26.3 | 26 |
| 1200 | 27.5 | 14 |
| 1460 | 31.5 | 5 |

During the entire time required for the production of aqueous solutions of sulphuric acid containing 31.5% sulphuric acid, 31% of the sulphur dioxide was absorbed.

Again the same procedure was followed using an aqueous absorption medium containing only 0.16% by weight of aluminum in the form of aluminum sulphate. The concentration of the sulphuric acid produced in per cent by weight at the end of the total elapsed time and the sulphur dioxide absorbed in per cent by volume at the end of definite successive periods of time between the last and preceding determinations are included in Table 3.

*Table 3*

| Time elapsed, minutes | Sulphuric acid, percent by weight | Sulphur dioxide absorbed, percent by volume |
|---|---|---|
| 0 | 0 | 100 |
| 25.7 | .5 | 35 |
| 50.5 | 1.0 | 15 |
| 100.4 | 1.4 | 5 |
| 350 | 2 | 0–1 |

During the entire time required for the production of aqueous solutions of sulphuric acid containing 2% sulphuric acid, 6% of the sulphur dioxide was absorbed.

Another example for the operation of my process is given for absorbing sulphur dioxide from a gaseous mixture in an aqueous absorbing medium containing 0.03% by weight of manganese in the form of manganese sulphate and 0.20% by weight of aluminum in the form of aluminum chloride. In order that comparable results might be obtained, the rate of flow of the gaseous mixture and the volume of absorbing medium used was the same as in the preceding example. The concentration of the sulphuric acid produced in per cent by weight at the end of the total elapsed time and the sulphur dioxide absorbed in per cent by volume at the end of definite successive intervals of time between the last and preceding determinations are included in Table 4.

*Table 4*

| Time elapsed, minutes | Sulphuric acid, percent by weight | Sulphur dioxide absorbed, percent by volume |
|---|---|---|
| 0 | 0 | 100 |
| 150 | 13.1 | 100 |
| 200 | 16.3 | 74 |
| 250 | 18.5 | 53 |
| 300 | 19.2 | 32 |
| 350 | 19.5 | 12 |

A third example of the operation of my process is given for absorbing sulphur dioxide from a gaseous mixture in an aqueous absorbing medium containing 0.03% by weight of manganese in the form of manganese sulphate and 0.13% by weight of aluminum in the form of aluminum nitrate. In order that comparable results might be obtained, the rate of flow of the gaseous mixture and the volume of absorbing medium used was the same as in the preceding examples. The concentration of the sulphuric acid produced in per cent by weight at the end of the total elapsed time and the sulphur dioxide absorbed in per cent by volume at the end of definite successive intervals of time between the last and preceding determinations are included in Table 5.

*Table 5*

| Time elapsed, minutes | Sulphuric acid, percent by weight | Sulphur dioxide absorbed, percent by volume |
|---|---|---|
| 0 | 0 | 100 |
| 50 | 4.1 | 83 |
| 100 | 7.4 | 74 |
| 175 | 11.7 | 68 |
| 250 | 15.4 | 66 |
| 325 | 18.6 | 61 |
| 363 | 19.1 | 58 |

A fourth example of the operation of my process is given for absorbing sulphur dioxide from a gaseous mixture of substantially the same composition and at substantially the same rate as used in the preceding examples in aqueous absorbing mediums containing 0.03% by weight of manganese in the form of manganese sulphate and varying concentrations of aluminum in the form of aluminum sulphate. In this example total time elapsed in carrying out the absorption with each of the respective absorbing mediums was the same. The concentration of aluminum in per cent by weight in the absorbing medium, the concentration of the sulphuric acid produced in per cent by weight at the end of the total elapsed time, the sulphur dioxide absorbed in per cent by volume based upon the total amount of sulphur dioxide admitted during the entire elapsed time, and the relative efficiency of sulphur dioxide absorption in per cent based on the per cent by volume of sulphur dioxide absorbed when no aluminum is present in solution are included in Table 6.

*Table 6*

| Aluminum concentration, percent by weight | Sulphuric acid produced, percent by weight | Sulphur dioxide absorbed, percent by volume | Relative efficiency of sulphur dioxide absorption, percent |
|---|---|---|---|
| 0.0 | 7.0 | 24.2 | 100 |
| 0.16 | 18.2 | 67.4 | 278 |
| 1.03 | 16.9 | 63.0 | 261 |
| 2.02 | 14.7 | 47.8 | 197 |
| 3.47 | 9.5 | 30.6 | 126 |

It is evident that there are numerous factors which will influence conditions for the most satisfactory operation of my invention, the actual limits of which cannot be determined except by a detailed study of each set of raw materials and the finished product involved.

The sulphur dioxide used in my process may be obtained from any suitable source, such as the burning of elemental sulphur, the roasting of sulphur bearing ores or the decomposition of intermediate materials, such as aluminum sulphate obtained from aluminum containing materials and produced in a step or steps involved in the production of elemental aluminum from such materials. Such gaseous mixtures will ordinarily contain from 4 to 20% by volume of sulphur dioxide. However, under some circumstances the concentration of sulphur dioxide in the gaseous mixture may be as low as the order of 1% by volume.

Prior to the absorption of the sulphur dioxide from a gaseous mixture containing the same, oxygen is added to such a mixture so that oxygen is present in the resulting mixture in the ratio of at least 0.5 mol of oxygen for each mol of sulphur dioxide. Ordinarily 2.5 to 3 mols of air per each mol of sulphur dioxide in the gaseous mixture is used for this purpose.

The aqueous absorbing medium used contains manganese in an amount which has been known to be most effective when used alone for the absorption of sulphur dioxide from gaseous mixtures, namely, in the order of 0.05% by weight of manganese supplied as the sulphate, nitrate or other water soluble salt. Aqueous absorbing mediums containing 0.03 and 0.04% and even higher concentrations in per cent by weight of manganese may be suitable for this purpose and are so included. In addition many absorbing mediums may contain aluminum in the form of a water soluble salt in which the amount of aluminum used may be varied in rather wide limits, such as of the order of 0.05 to 5.0% by weight. The use of this liquid absorbing composition in which the aluminum are present in concentrations of the order of 0.1 to 1.0% by weight has been found to be particularly effective in producing a substantial increase in the per cent of sulphur dioxide absorbed and a substantial increase in the concentration of sulphuric acid which may be produced in a given time. The concentration of the aluminum in the absorbing medium may be varied according to the concentration of the sulphuric acid which is produced in order to appropriately increase the rate of sulphuric acid formation for that specific concentration. The aqueous absorbing medium containing both manganese and aluminum shows a marked increase in the per cent of sulphur dioxide absorbed as well as the rate of increase of concentration of sulphur dioxide used as compared with the use of an aqueous absorption medium containing either manganese or aluminhm alone, as is clearly shown in the drawing.

The gaseous mixture containing the sulphur dioxide may be brought into intimate contact with the liquid absorbing composition by any suitable means commonly used for contacting liquids and gases. The absorption of the sulphur dioxide and its subsequent conversion to sulphuric acid may be carried out discontinuously with the aqueous solution containing the sulphuric acid produced withdrawn when the desired concentration is reached. However, the most effective procedure is to carry out the operation continuously with the gaseous mixture passing countercurrent to the flow of the liquid absorbing composition with the rate of flow of the liquid so controlled that the desired concentration of sulphuric acid is contained in the aqueous solution withdrawn.

The concentration of dilute sulphuric acid solution produced may vary over a considerable range, although the upper limit for a variety of concentrations of both gas and absorbing mediums have not been determined. Concentrations up to approximately 40% by weight of $H_2SO_4$ may be obtained with a relatively high percentage of sulphur dioxide absorbed.

It will be seen, therefore, that this invention actually may be carried out by the use of various modifications and changes without departing from its spirit and scope, with only such limitations placed thereon as are imposed by the prior art.

I claim:

1. Process of making an aqueous solution containing sulphuric acid from sulphur dioxide, which comprises, preparing an aqueous solution of aluminum sulphate and manganese sulphate wherein the concentration of aluminum is of the order of 0.1 to 1% by weight and the concentration of manganese is of the order of 0.05% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of $H_2SO_4$.

2. Process of making an aqueous solution containing sulphuric acid from sulphur dioxide, which comprises, preparing an aqueous solution of aluminum sulphate and manganese sulphate wherein the concentration of aluminum is of the order of 0.05 to 2.5% by weight and the concentration of manganese is of the order of 0.05% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of $H_2SO_4$.

3. Process of making an aqueous solution containing sulphuric acid from sulphur dioxide, which comprises, preparing an aqueous solution of aluminum sulphate and manganese sulphate wherein the concentration of aluminum is of the order of 0.05 to 5% by weight and the concentration of manganese is of the order of 0.05% by weight; passing a stream of a gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of $H_2SO_4$.

4. Process of making an aqueous solution containing sulphuric acid from sulphur dioxide, which comprises, preparing an aqueous solution of aluminum nitrate and manganese sulphate wherein the concentration of aluminum is of the order of 0.1 to 1% by weight and the concentration of manganese is of the order of 0.05% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of H₂SO₄.

5. Process of making an aqueous solution containing sulphuric acid from sulphur dioxide, which comprises, preparing an aqueous solution of aluminium chloride and manganese sulphate wherein the concentration of aluminum is of the order of 0.1 to 1% by weight and the concentration of manganese is of the order of 0.05% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of H₂SO₄.

6. Process of making an aqueous solution containing sulphuric acid from sulphur dioxide, which comprises, preparing an aqueous solution containing aluminum and manganese wherein the concentration of the aluminum is of the order of 0.1 to 1% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of H₂SO₄.

7. Process of making an aqueous solution containing sulphuric acid from sulphur dioxide, which comprises, preparing an aqueous solution containing aluminum and manganese wherein the concentration of the aluminum is of the order of 0.05 to 2.5% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of H₂SO₄.

8. Process of making an aqueous solution containing sulphuric acid from sulphur dioxide, which comprises, preparing an aqueous solution containing aluminum and manganese wherein the concentration of the aluminum is of the order of 0.05 to 5% by weight; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of H₂SO₄.

9. Process of making an aqueous solution containing sulphuric acid from sulphur dioxide, which comprises, preparing an aqueous solution containing aluminum and manganese wherein the manganese and aluminum are present in relatively small amounts and in the concentration required for the maximum rate of conversion for the concentration of sulphuric acid produced; passing a stream of gas containing sulphur dioxide and oxygen in intimate contact with and counter-current to the flow of the aqueous solution in a closed gas absorbing zone; and withdrawing from the enclosed gas absorbing zone an aqueous solution of sulphuric acid containing up to approximately 40% by weight of H₂SO₄.

10. Process of making an aqueous solution containing sulphuric acid from sulphuric dioxide, which comprises, preparing an aqueous solution containing aluminum and manganese wherein the concentration of the aluminum is of the order of 0.1 to 1% by weight; passing a stream of gas containing sulphur dioxide and oxygen in intimate contact with the aqueous solution until a concentration of sulphuric acid in the solution up to approximately 40% by weight is produced.

11. Process of making an aqueous solution containing sulphuric acid from sulphuric dioxide, which comprises, preparing an aqueous solution containing aluminum and manganese wherein the concentration of the aluminum is of the order of 0.05 to 2.5% by weight; passing a stream of gas containing sulphuric dioxide and oxygen in intimate contact with the aqueous solution until a concentration of sulphuric acid in the solution up to approximately 40% by weight is produced.

12. Process of making an aqueous solution containing sulphuric acid from sulphuric dioxide, which comprises, preparing an aqueous solution containing aluminum and manganese wherein the concentration of the aluminum is of the order of 0.05 to 5% by weight; and passing a stream of gas containing sulphuric dioxide and oxygen in intimate contact with the aqueous solution until a concentration of sulphuric acid in the solution up to approximately 40% by weight is produced.

13. Process of making an aqueous solution containing sulphuric acid from sulphur dioxide, which comprises, preparing an aqueous solution containing aluminum and manganese wherein the manganese and aluminum are present in relatively small amounts and in the concentration required for the maximum rate of conversion for the concentration of sulphuric acid produced; and passing a stream of gas containing sulphuric dioxide and oxygen in intimate contact with the aqueous solution until a concentration of sulphuric acid in the solution up to approximately 40% by weight is produced.

JOHN H. WALTHALL.

CERTIFICATE OF CORRECTION.

Patent No. 2,188,324. January 30, 1940.

JOHN H. WALTHALL.

It is hereby certified that error appears in the printed specification of the above numbered patent requiring correction as follows: Page 3, first column, line 63, for "aluminhm" read aluminum; page 4, second column, lines 14-15, 25-26, 30, 36-37, 41-42 and 55, claims 10 to 13 inclusive, for "sulphuric dioxide" read sulphur dioxide; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)